United States Patent [19]

Nakamura et al.

[11] Patent Number: 5,471,365
[45] Date of Patent: Nov. 28, 1995

[54] SOLID ELECTROLYTIC CAPACITOR AND ITS MANUFACTURING METHOD

[75] Inventors: Shinji Nakamura; Choujirou Kuriyama, both of Kyoto, Japan

[73] Assignee: Rohm Co., Ltd., Kyoto, Japan

[21] Appl. No.: 264,193

[22] Filed: Jun. 22, 1994

Related U.S. Application Data

[63] Continuation of Ser. No. 940,277, Sep. 3, 1992.

[30] Foreign Application Priority Data

Sep. 5, 1991 [JP] Japan .................................. 3-254596
Mar. 18, 1992 [JP] Japan .................................. 4-062067

[51] Int. Cl.⁶ .................................................. H01G 9/00
[52] U.S. Cl. .......................... 361/523; 361/525; 361/528; 361/539
[58] Field of Search ...................... 361/523, 526, 361/525, 528, 539, 540

[56] References Cited

U.S. PATENT DOCUMENTS 4,943,892  7/1990  Tsuchiya et al. .................. 361/525
5,005,107  4/1991  Kobashi et al. .................... 361/540

FOREIGN PATENT DOCUMENTS

0501805A1  9/1992  European Pat. Off. .
2-32521    2/1990  Japan .
3-3220     3/1991  Japan .

*Primary Examiner*—Marvin M. Lateef
*Attorney, Agent, or Firm*—Nikaido, Marmelstein, Murray & Oram

[57] ABSTRACT

A solid electrolytic capacitor comprising a sintered body made of a valve metal having a terminal wire, a dielectric film, a metallic oxide layer, and a conductive polymer layer formed on the sintered body in this order is described. The polymer layer is so formed that it covers the entire surface of the sintered body. Methods of manufacturing a solid electrolytic capacitor provided with a conductive polymer layer are also described. In the electrolytic polymerization process, the wire attached to the sintered body is used as an anode terminal, and a conductive paste is applied to connect the terminal and a metallic oxide layer electrically over an insulating dielectric film in order for the polymerization to proceed. Electrolytic polymerization is also performed by forming a graphite layer beforehand, a part of which is made in contact with the terminal. Chemical polymerization in an acid environment is applicable, too.

7 Claims, 6 Drawing Sheets

SOLID ELECTROLYTIC CAPACITOR AND ITS MANUFACTURING METHOD

This application is a continuation of application Ser. No. 07/940,277 filed Sep. 3, 1992.

BACKGROUND OF THE INVENTION

1. Field of the Invention

The present invention relates to a solid electrolytic capacitor and its manufacturing method.

2. Description of the Prior Art

Conventional solid electrolytic capacitors are manufactured in the subsequently-described manner.

First, an oxide film is formed through anodic oxidation on the surface of a sintered body made of a valve metal such as tantalum (Ta), aluminum (Al) and niobium (Nb). Then, after a manganese nitrate water solution is impregnated into it, a manganese dioxide ($MnO_2$) layer which serves as an electrolyte is formed on the oxide film through thermal decomposition of the manganese nitrate. Lastly, a graphite layer and a silver layer for forming an electrode are formed on the manganese dioxide layer.

Subsequently, an example of a solid electrolytic capacitor which is manufactured in the above-mentioned manner will be described.

Figure 1:
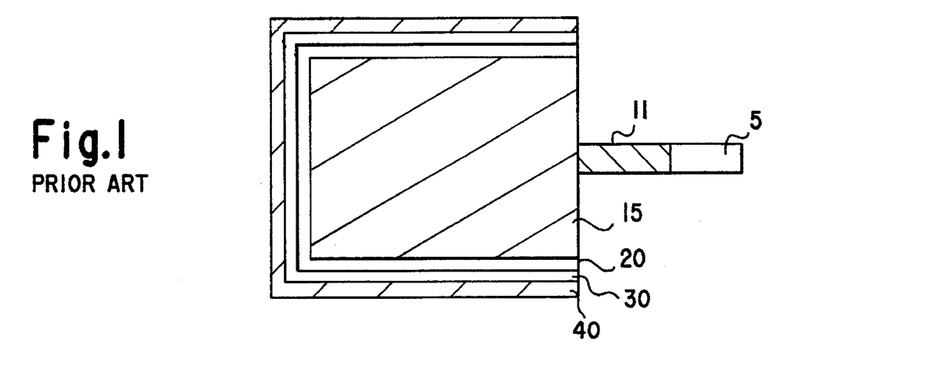
FIG. 1 is a cross-sectional view showing the structure of a conventional solid electrolytic capacitor.
Figure 2A:
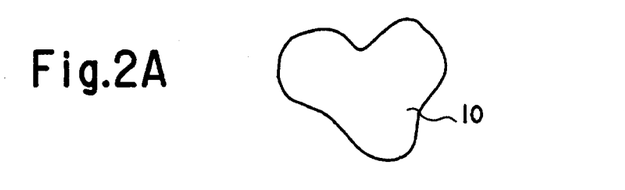
FIGS. 2A to 2C show an inside structure of a sintered body of the conventional capacitor and the present invention in the manufacturing process of the sintered body.
Figure 2B:
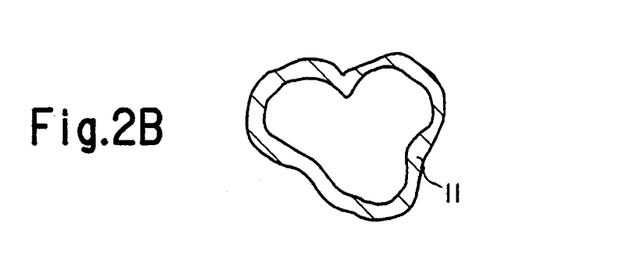
Figure 2C:
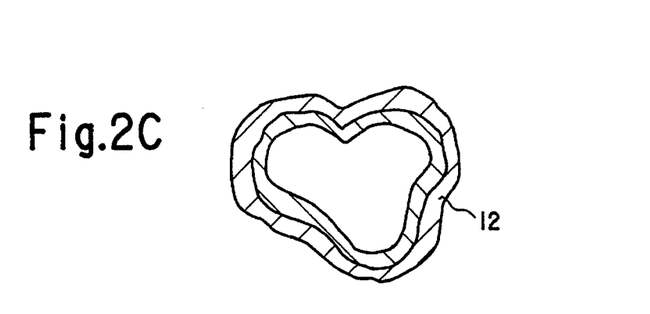

FIG. 1 shows a cross-sectional structure of a solid electrolytic capacitor made of tantalum. FIGS. 2A to 2C are cross-sectional views showing a manner in which a tantalum pentoxide layer ($Ta_2O_5$ layer) 11 and a first manganese dioxide layer (first $MnO_2$ layer) 12 are formed on a part of a porous tantalum sintered body (Ta sintered body) 10 of the solid electrolytic capacitor of FIG. 1. A sintered body layer 15 shown in FIG. 1 is formed by forming the tantalum pentoxide layer 11 and the first manganese dioxide layer 12 on the surface of the tantalum sintered body 10 as shown in FIGS. 2A to 2C. A wire 5 made of tantalum and constituting a terminal is electrically connected and fixed to the tantalum sintered body 10 (Fig. 2A). At the time of anodic oxidation of the tantalum sintered body 10, the tantalum pentoxide layer 11 is also formed on the wire 5 (FIG. 1).

As shown in FIG. 1, a second manganese dioxide layer (second $MnO_2$ layer) 20 is formed on the surface of the sintered body layer 15. The layer 20 covers the external surface of the sintered body 15 with hardly intruding into the sintered body layer 15. A graphite layer (Gr layer) 30 and a silver layer (Ag layer) 40 are formed on the second manganese layer 20.

The above-described conventional capacitor offers the following problems.

Firstly, the conventional capacitor is weak to external stress since the sintered body made of a valve metal has a poor mechanical strength. To lighten the stress, the second manganese dioxide layer is normally formed to be thick (30 to 40 µm). However, since the oxide film is extremely thin (approximately tens to thousands of angstroms), it is weak to physical stress, and is apt to break down.

Secondly, the conventional capacitor is high in equivalent series resistance since manganese dioxide which serves as an electrolyte is high in resistivity (approximately 1 to 10Ω.cm).

Thirdly, it is difficult to improve the damp resisting property of the capacitor since the manganese dioxide layer has a poor water resisting property.

SUMMARY OF THE INVENTION

An object of the present invention is to provide a solid electrolytic capacitor excellent in high frequency property and water resisting property and strong to external stress.

Another object of the present invention is to provide a method of manufacturing such a solid electrolytic capacitor.

A solid electrolytic capacitor of the present invention is provided with a sintered body made of a valve metal, a metallic oxide layer provided on a periphery of the sintered body, and a conductive high polymer layer provided on a periphery of the metallic oxide layer.

According to such a solid electrolytic capacitor, since the conductive high polymer layer, provided on the metallic oxide layer, which functions as a buffer coat absorbs external stress and prevents the metallic oxide layer from breaking down, mechanical strength increases. Since the conductive high polymer layer has a low resistivity (for example, approximately 0.01Ωcm ), equivalent series resistance at a high frequency decreases.

A method of manufacturing a solid electrolytic capacitor, according to the present invention, in which a dielectric film is formed on a surface of a sintered body having a terminal and made of a valve metal and a metallic oxide layer is formed on the dielectric film is characterized in that conductive paste is applied to said terminal, and that a conductive high polymer layer is formed on said metallic oxide layer by performing electrolytic oxidation polymerization by electrically connecting the terminal with said metallic oxide layer through said conductive paste.

BRIEF DESCRIPTION OF THE DRAWINGS

These and other objects and features of this invention will become clear from the following description taken in conjunction with the preferred embodiments with reference to the accompanied drawings in which.

DESCRIPTION OF THE PREFERRED EMBODIMENTS

Embodiments of the present invention will hereinafter be described with reference to the drawings. Portions the same as those of FIGS. 1 and 2A to 2C are denoted by the same reference designations, and a detailed description thereof will be omitted.

FIGS. 3A to 3I show a manufacturing process of a solid electrolytic capacitor which is a first embodiment of the present invention.

Figure 3A:
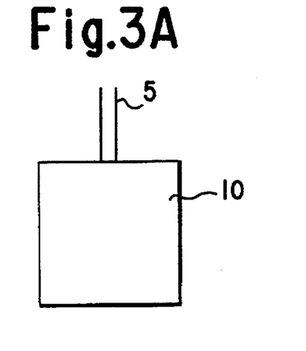
FIGS. 3A to 3I show a manufacturing process according to a first manufacturing method of a solid electrolytic capacitor of the present invention and a solid electrolytic capacitor manufactured according to the method.
Figure 3B:
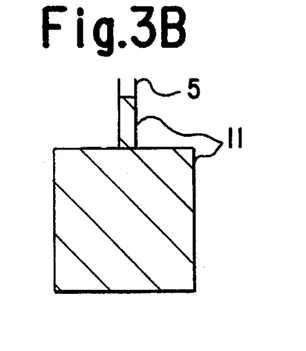

First, a tantalum sintered body 10 of 140CV/p (FIG. 3A) was soaked in a phosphoric acid water solution of 0.1 weight %, and through anodic oxidation for two to three hours at 100 to 200V, a tantalum pentoxide layer ($Ta_2O_5$) 11 was formed on the surface of the tantalum sintered body 10 and a part of the surface of a wire 5 as shown in FIG. 3B.

Figure 3C:
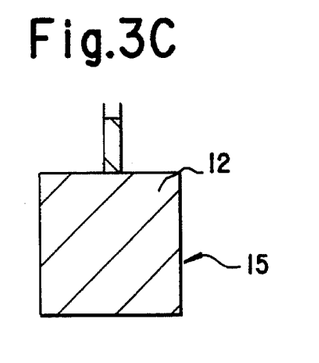
Figure 3D:
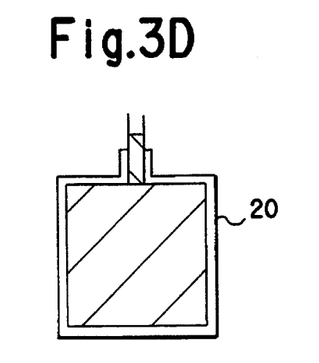

Then, after washed in pure water, the anodically oxidized tantalum sintered body 10 was soaked in a manganese nitrate water solution of 40 to 60 weight %. Then, after water was evaporated, the manganese nitrate was thermally decomposed at 200° to 300° C. The process in which a manganese nitrate water solution is impregnated into the tantalum sintered body 10 and is thermally decomposed was repeated five times. As a result, as shown in FIG. 3C, a first manganese dioxide layer 12 was formed on the tantalum pentoxide layer 11 (FIG. 3B) and the tantalum sintered body 10 was turned into a sintered body layer 15, and further, as shown in FIG. 3D, a second manganese dioxide layer 20 was formed on the sintered body layer 15.

A sample of a conventional capacitor was also made according to the process of FIGS. 3A to 3D for the purpose of comparing it with a sample of the present invention in subsequently described performance tests. The impregnation process and the thermal decomposition process were repeated ten times, respectively. In the first seven impregnation processes, the first manganese dioxide layer 12 was mainly formed on the internal surface of the sintered body. In the subsequent three impregnation processes, the second manganese dioxide layer 20 was mainly formed on the external surface of the sintered body by use of manganese solutions of different specific gravities.

While the first and second manganese dioxide layers 12 and 20 are formed by use of one kind of manganese nitrate water solution in this embodiment since it is possible to improve stress resisting property by forming a subsequently-described polypyrrole layer 50, they may be formed through two impregnation processes by use of manganese nitrate water solutions of different specific gravities similarly to the conventional capacitor.

Figure 3E:
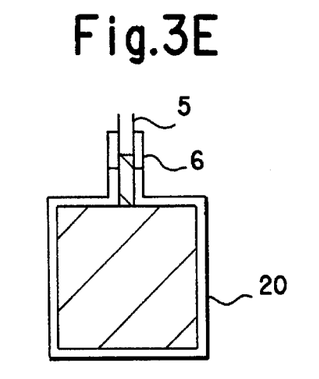

Then, conductive paste 6 was applied to a part of the wire 5 as shown in FIG. 3E to electrically connect the wire 5 with the second manganese dioxide layer 20.

It is impossible to electrically form the subsequently-described polypyrrole layer 50 (FIG. 3G) on the second manganese dioxide layer 20 without the conductive paste 6. This is because it is impossible to forte a conductive high polymer layer since the tantalum pentoxide layer 11 which is an insulator is provided between the wire 5 and the first and second manganese dioxide layers 12 and 20. In forming a conductive high polymer layer such as the polypyrrole layer 50 by performing electrolytic oxidation polymerization, since it is necessary that the second manganese dioxide layer 20 be an anode, the conductive paste 6 for forming an electrode is applied to a part of the wire 5 after the first and second manganese dioxide layers 12 and 20 are formed in this embodiment. As such conductive paste 6, one made of graphite may be used.

Figure 3F:
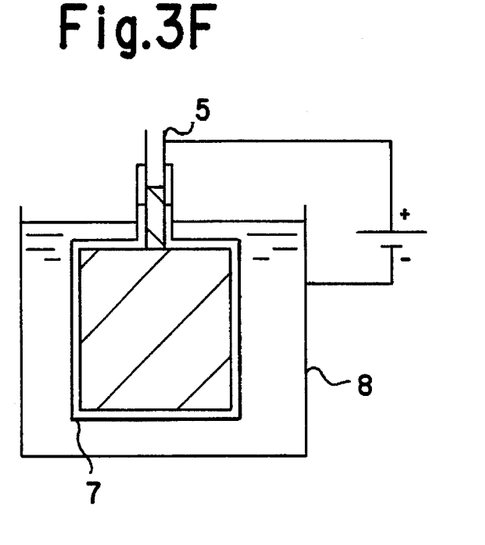
Figure 3G:
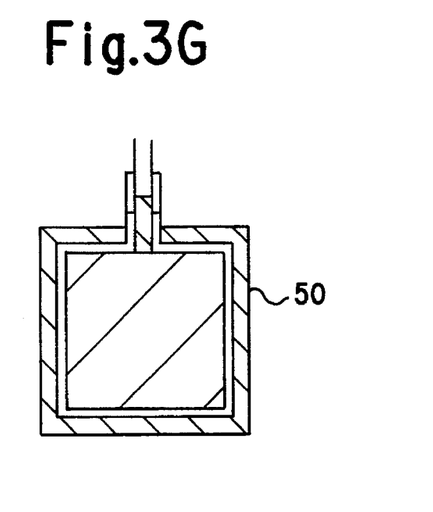

Then, the polypyrrole layer 50 with a thickness of approximately 30 μm as shown in FIG. 3G was formed by performing electrolytic oxidation polymerization at 100 μampere and for 30 to 60 minutes per sintered body by making the wire 5 plus and a tub 8 of an electrolytic solution 7 minus as shown in FIG. 3F. The thickness of the polypyrrole layer 50 which is a conductive high polymer layer can be controlled by adjusting the quantity of electricity (quantity of Coulomb).

In this embodiment, pyrrole of 0.5 to 1.0 wt % was used as a monomer which is a material of the polypyrrole layer 50; acetonitrile, as a medium; an electrolytic solution consisting of p-toluenesulfonic acid tetraethyl ammonium of 0.5 to 1.0 wt %, as a supporting electrolyte.

Pyrrole, furan and thiophene may be used as the monomer which is a material of a conductive high polymer layer. Polymers made of these monomers have conventionally been known as conductive high polymers. The monomer is not limited thereto. Any monomer may be used as long as it forms a conductive polymer. It is preferable to use pyrrole since pyrrole forms a polypyrrole layer having a low resistance.

A polar aprotic solvent such as the above-mentioned acetonitrile may be used as the medium. A matter which generates a univalent anion such as the above-mentioned p-toluene-sulfonic acid tetraethyl ammonium may be used as the supporting electrolyte.

The polypyrrole layer 50 serves as a buffer coat, that is, a buffer member for lightening stress from a molded portion and improving water resisting property by preventing water intrusion from the external.

Figure 3H:
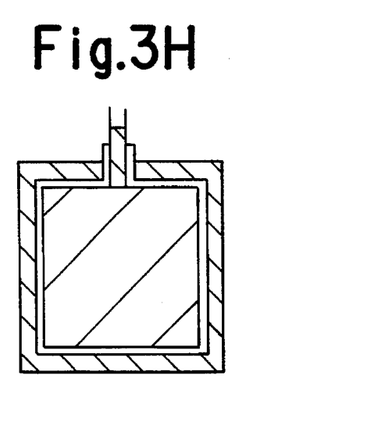

After the formation of the polypyrrole layer 50 was completed, the conductive paste 6 was removed with tweezers as shown in FIG. 3H. The conductive paste 6 can be removed by a conventionally-known physical or chemical process such as the one using plasma. The conductive paste 6 may be removed at any time as long as it is removed after the polypyrrole layer 50 is formed.

Figure 3I:
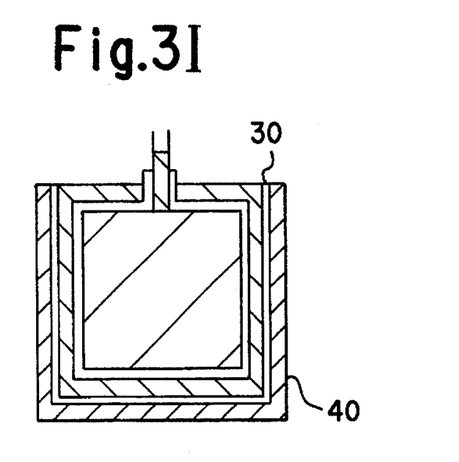

Lastly, a graphite layer 30 was formed by soaking the sintered body in a graphite solution, and a silver layer 40 was formed by applying silver paste to the sintered body as shown in FIG. 3I. These external metallic layers can be formed according to a method conventionally known as a manufacturing method of a solid electrolytic capacitor.

Concerning the above-mentioned sample of a conventional solid electrolytic capacitor, the graphite layer 30 and the silver layer 40 were similarly formed on the second manganese dioxide layer 20.

With respect to a solid electrolytic capacitor sample obtained by the above-described method, the following performance tests were carried out. The test results are shown in Table 1 together with those of the sample of a conventional capacitor.

Load Test

A solid electrolytic capacitors has a fatal defect that it burns by a short circuit when its oxide layer ($Ta_2O_5$ layer 11) breaks down by external physical stress. In order to examine mechanical strength, a load test was carried out where at what load the capacitor breaks down was examined. As shown in Table 1, while the conventional capacitor was resistant to only loads of up to 5 to 10 kgp, the capacitor according to the first embodiment was resistant to loads of up to at least 20 kgp.

Measurement of Equivalent Series Resistance at High Frequency

Equivalent series resistance at a high frequency (100 KHz) (high frequency ESR) of the sample was measured.

Measurement of Damp Resisting Property

The sample was left in a room of a constant humidity (85° C., 85%). A capacity C at the time of the start of the test and a capacity change amount Δ C obtained after 500 hours were measured to obtain a capacity change rate Δ C/C.

Thermal Shock Test

Results of a temperature cycle test (−55° C., 30 minutes; 125° C., 30 minutes) are shown in Table 1.

A solid electrolytic capacitors has a fatal defect that it burns by a short circuit when its oxide film ($Ta_2O_5$ layer 11) is broken by stress caused by a temperature change. Stress resisting property of the capacitor can be found by examining by what extent of thermal shock the capacitor is shifted to the short circuit condition based on a change in electric property in the thermal shock test.

FIGS. 4A to 4I show a manufacturing process of a solid electrolytic capacitor which is a second embodiment of the present invention.

Description of the process shown in FIGS. 4A to 4D will be omitted since the process are the same as that of FIGS. 3A to 3D.

Figure 4A:
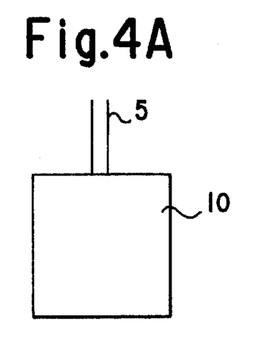
FIGS. 4A to 4I show a manufacturing process according to a second manufacturing method of a solid electrolytic capacitor of the present invention and a solid electrolytic capacitor manufactured according to the method.
Figure 4B:
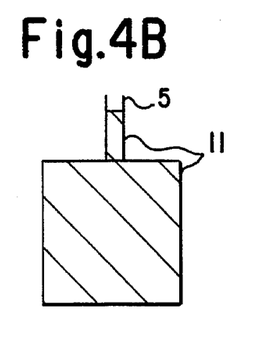
Figure 4C:
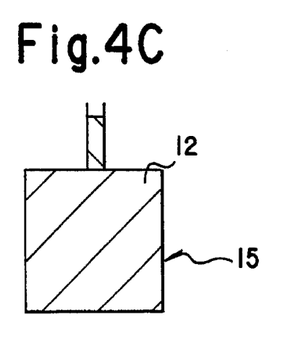
Figure 4D:
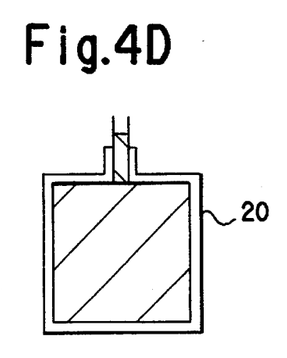
Figure 4E:
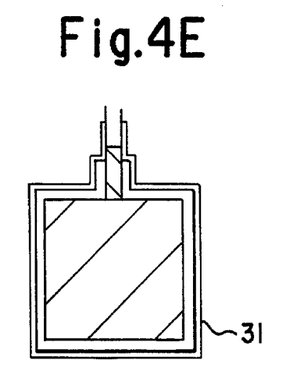

As previously mentioned, it is impossible to electrically form the polypyrrole layer 50 on the second manganese dioxide layer 20 since the tantalum pentoxide layer 11 which is an insulator is provided between the wire 5 and the first and second manganese dioxide layers 12 and 20. Therefore, in order to electrically form it, it is necessary that the second manganese dioxide layer 20 be an anode. In this embodiment, a first graphite layer 31 was formed as shown in FIG. 4E by soaking the sintered body deep into a graphite solution until the wire 5 is soaked therein. As a result, an effect is obtained which is similar to that provided by the application of the conductive paste 6 in the first embodiment.

Figure 4F:
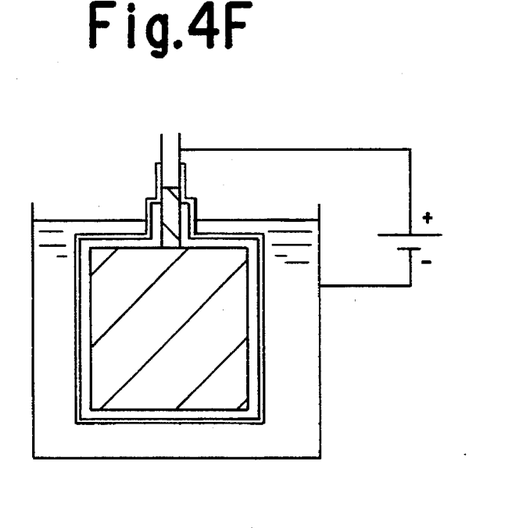
Figure 4G:
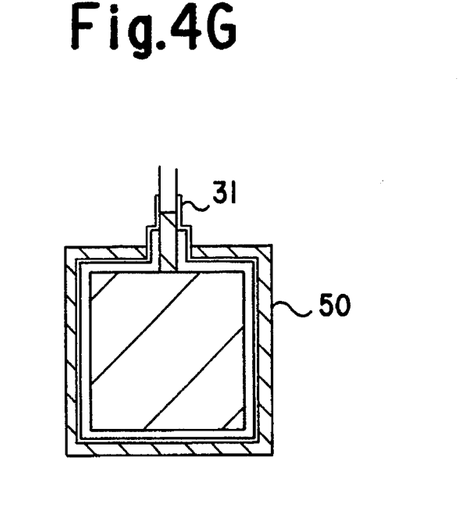
Figure 4H:
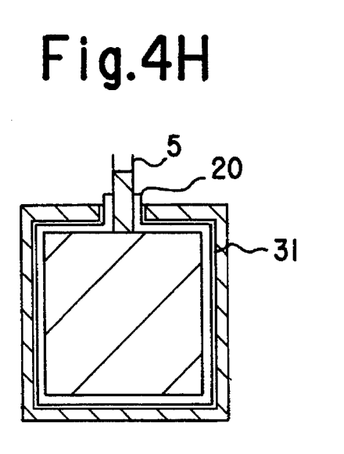

Then, as shown in FIG. 4F, the polypyrrole layer 50 with a thickness of approximately 30 μm was formed by the electrolytic oxidation polymerization method similarly to the first embodiment (FIGS. 3F and 3G).

After the formation of the polypyrrole layer 50 was completed, a portion, of the first graphite layer 31, which was exposed from the polypyrrole layer 50 and was in contact with the wire 5 and the second manganese dioxide layer 20 was removed with tweezers. The graphite layer 31 may be removed by use of a conventionally-known physical or chemical process similarly to the case of removing the conductive paste 6 in the first embodiment. It may be removed at any time as long as it is removed after the polypyrrole layer 50 is formed.

Figure 4I:
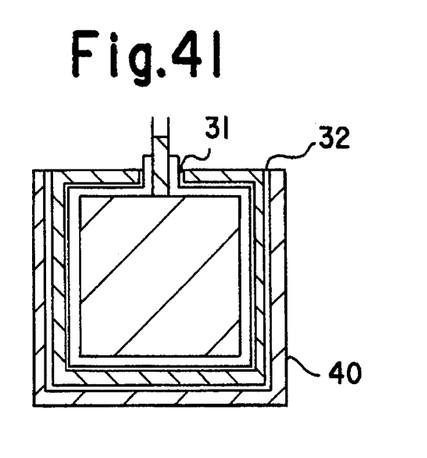

Lastly, as shown in FIG. 4I, a second graphite layer 32 was formed in a manner similar to that in which the graphite layer 30 of the first embodiment was formed (FIG. 3I), and the silver layer 40 was formed in a manner similar to that of the first embodiment (FIG. 3I).

As a result of carrying out the above-described performance tests with respect to a solid electrolytic capacitor sample obtained by the above-described method, the same results as those of the first embodiment were obtained.

The second graphite layer 32 was formed inside the silver layer 40 to reduce contact resistance with the polypyrrole layer 50 similarly to the first embodiment.

FIGS. 5A to 5H show a manufacturing process of a solid electrolytic capacitor which is a third embodiment of the present invention.

Description of the process shown in FIGS. 5A to 5D will be omitted since the process is the same as that of FIGS. 3A to 3D.

While the polymerization of pyrrole was performed by the electrolytic oxidation polymerization method in the above-described first and second embodiments, it was performed by a chemical polymerization method in a subsequently-described manner in this embodiment.

Figure 5A:
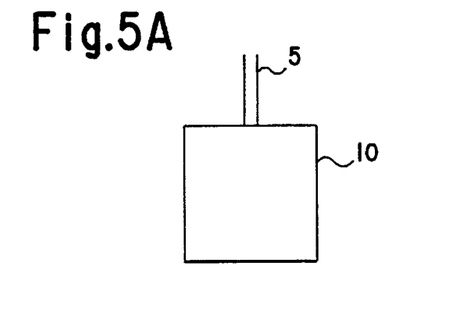
FIGS. 5A to 5H show a manufacturing process according to a third manufacturing method of a solid electrolytic capacitor of the present invention and a solid electrolytic capacitor manufactured according to the method.
Figure 5B:
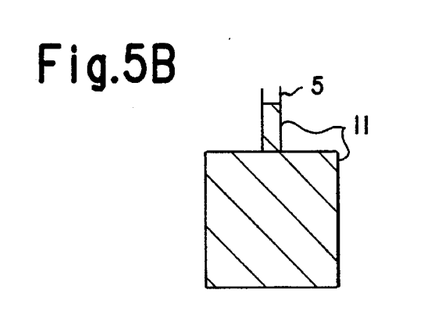
Figure 5C:
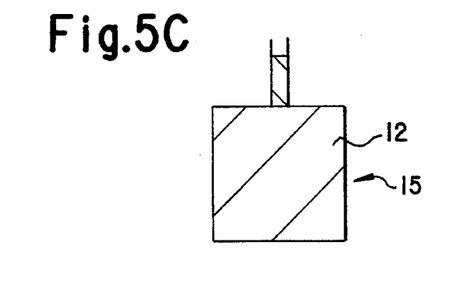
Figure 5D:
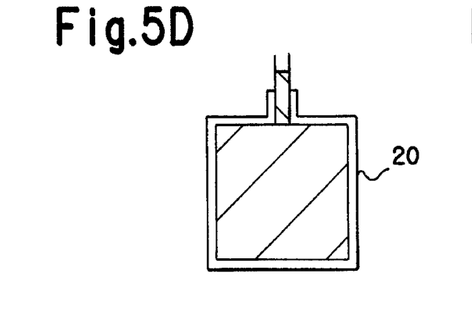
Figure 5E:
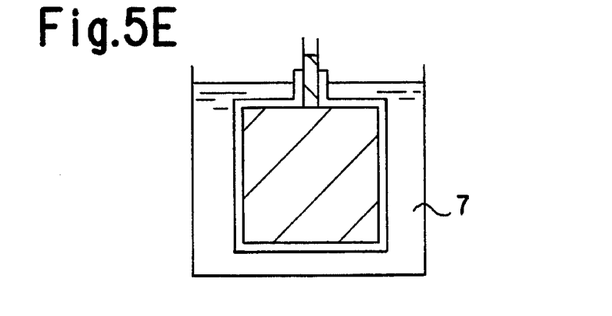
Figure 5F:
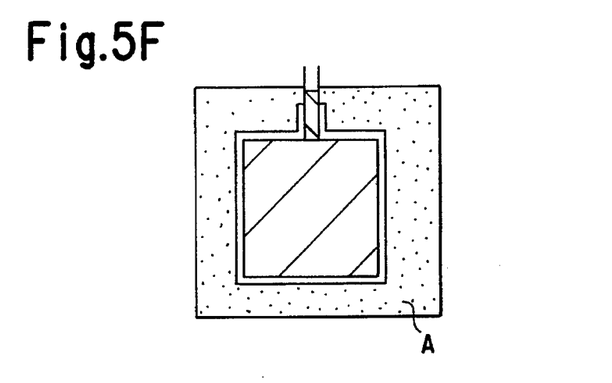
Figure 5G:
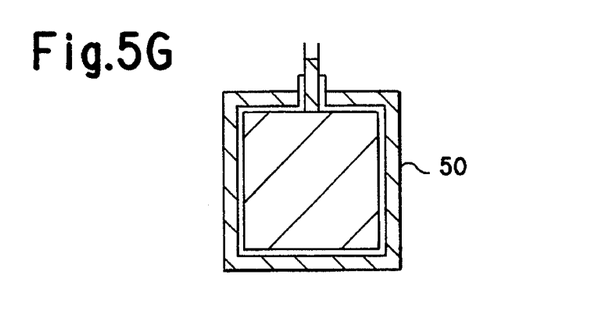

First, after the second manganese layer 20 was formed as shown in FIG. 5D, the sintered body was soaked at 252.5° C. for five minutes in an electrolytic solution 7 similar to that used in the first embodiment as shown in FIG. 5E. Then, as shown in FIG. 5F, it was polymerized at 50° C. for 30 minutes in a sulfuric acid atmosphere A. The atmosphere is not limited to the sulfuric acid atmosphere. Any atmosphere may be used as long as it is an acid environment. "An acid environment" means "an acid atmosphere" in the gaseous phase and "an acid solution" in the liquid phase. The previously-described impregnation process and polymerization process were repeated one to several times to form the polypyrrole layer 50 with a thickness of approximately 30μm (FIG. 5G).

Since the resistance of the formed polypyrrole layer 50 is higher than that of the polypyrrole layer formed by the electrolytic oxidation polymerization method, the polymerization is preferably performed by the electrolytic oxidation polymerization method.

Figure 5H:
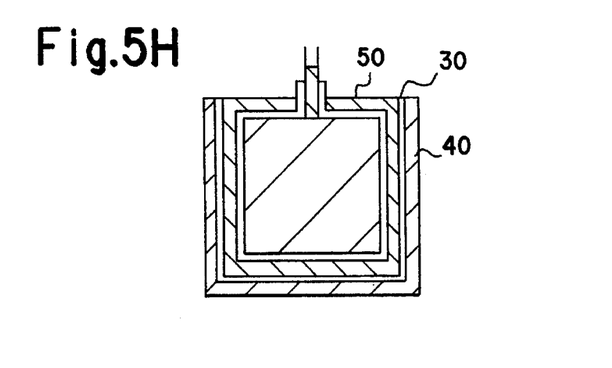

Lastly, as shown in FIG. 5H, the graphite layer 30 and the silver layer 40 were formed in a manner similar to that of the first embodiment (FIG. 3I).

As a result of carrying out the above-described performance tests with respect to a solid electrolytic capacitor sample obtained by the above-described method, the same results as those of the first embodiment were obtained.

While the electrolyte is made of manganese dioxide in the above-described embodiments, a metallic oxide such as lead oxide and lithium oxide may be used instead of manganese dioxide. When these metallic oxides were used to form a metallic oxide layer, results were obtained which were the same as those of the case in which manganese dioxide was used.

TABLE 1

| Name of the Test | Prior Art | First Embodiment |
| --- | --- | --- |
| Load Test | 5 to 10 kgp | 20 kgp or more |
| High Frequency ESR [100 KHz] | approximately 1Ω | 0.1Ω or less |
| Damp Resisting Property [85° C., 85%] [Capacity Change ΔC/C] | 5% | 2% or less |
| Thermal Shock Test (Cycle) [−55 to 125° C.] | 5 | 50 |

Obviously, many modifications and variations of the present invention are possible in light of the above teachings. It is therefore to be understood that within the scope of the appended claims, the invention may be practiced other than as specifically described.

What is claimed is:

1. A solid electrolytic capacitor comprising:

a sintered body made of a valve metal and having a terminal wire;

a dielectric film formed on a periphery of the sintered body;

a metallic oxide layer provided on the dielectric film; and a conductive polymer layer provided on the metallic oxide layer, wherein said conductive polymer layer covers an entire periphery of the sintered body to a unction with the terminal wire.

2. A solid electrolytic capacitor according to claim 1, wherein said conductive polymer layer is a polypyrrole layer.

3. A solid electrolytic capacitor according to claim 1, wherein said metallic oxide layer is a manganese dioxide layer.

4. A solid electrolytic capacitor comprising:

a sintered body member including a tantalum sintered body, a terminal wire attached to the sintered body, a dielectric film formed on a periphery of the sintered body, and a first manganese dioxide layer formed on the dielectric film;

a second manganese dioxide layer provided on the sintered body member;

a conductive polymer layer provided on the second manganese dioxide layer, wherein said conductive polymer layer covers an entire periphery of the sintered body to a junction with the terminal wire;

a graphite layer provided on the conductive polymer layer; and a metallic layer provided on the graphite layer.

5. A method of manufacturing a solid electrolytic capacitor provided with a conductive polymer layer, which method comprises:

providing a sintered body member in which a dielectric film is formed on a periphery of a sintered body made of a valve metal and equipped with a terminal wire, and a metallic oxide layer is formed on the dielectric film; and forming a conductive polymer layer on a periphery of the sintered body member by electrolytic oxidative polymerization of monomers of a compound capable of forming a conductive polymer, wherein the wire is used as an anode terminal, and a conductive paste is applied between the terminal wire and the metallic oxide layer over a part of the insulating dielectric film in order for electrolytic polymerization to proceed.

6. A method of manufacturing a solid electrolytic capacitor provided with a conductive polymer layer, which method comprises:

providing a sintered body member in which a dielectric film is formed on a periphery of a sintered body made of a valve metal and equipped with a terminal wire, and a metallic oxide layer is formed on the dielectric film;

forming a graphite layer on a periphery of the sintered body member, whereby an entire periphery of the metallic oxide layer and the dielectric film and a part not covered with the dielectric film are covered; and forming a conductive polymer layer on a periphery of the graphite layer by electrolytic oxidative polymerization of monomers of a compound capable of forming a conductive polymer, wherein the wire is used as an anode terminal.

7. A method of manufacturing a solid electrolytic capacitor provided with a conductive polymer layer, which method comprises:

providing a sintered body member in which a dielectric film is formed on a periphery of a sintered body made of a valve metal, and a metallic oxide layer is formed on the dielectric film;

and forming a conductive polymer layer on a periphery of the sintered body member by chemical polymerization of monomers of a compound capable of forming a conductive polymer, wherein said monomers are attached to the sintered body member by soaking the sintered body member in an electrolytic solution containing the monomer, and subsequently subjected to polymerization in an acid atmosphere.

* * * * *